US 8,213,993 B2

(12) United States Patent
Nino et al.

(10) Patent No.: US 8,213,993 B2
(45) Date of Patent: *Jul. 3, 2012

(54) MESSENGER STRAND MOUNTED PICO-CELL RADIO

(75) Inventors: Robert Nino, Newbury Park, CA (US); Dan Castellano, Cupertino, CA (US)

(73) Assignee: Public Wireless, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,210

(22) Filed: Nov. 29, 2011
(Under 37 CFR 1.47)

(65) Prior Publication Data
US 2012/0069882 A1 Mar. 22, 2012

Related U.S. Application Data

(63) Continuation of application No. 12/124,470, filed on May 21, 2008, now Pat. No. 8,082,007.

(51) Int. Cl.
*H04B 1/38* (2006.01)
*H04M 1/00* (2006.01)

(52) U.S. Cl. .................................. 455/561; 455/550.1
(58) Field of Classification Search .................. 455/561, 455/550.1, 562.1; 375/219, 222
See application file for complete search history.

(56) References Cited

U.S. PATENT DOCUMENTS

| | | | |
|---|---|---|---|
| 5,934,079 A | 8/1999 | Han et al. | |
| 6,957,042 B2 | 10/2005 | Williams | |
| 7,849,173 B1 | 12/2010 | Uhlik | |
| 8,082,007 B2 * | 12/2011 | Nino et al. | ............ 455/561 |
| 2002/0077151 A1 | 6/2002 | Matthews et al. | |
| 2002/0098869 A1 | 7/2002 | Struhsaker et al. | |
| 2006/0014488 A1 | 1/2006 | Davis et al. | |
| 2007/0087738 A1 | 4/2007 | Melkesetian | |
| 2007/0112948 A1 | 5/2007 | Uhlik | |
| 2008/0212969 A1 | 9/2008 | Fasshauer et al. | |
| 2008/0221951 A1 | 9/2008 | Stanforth et al. | |
| 2008/0222020 A1 | 9/2008 | Stanforth et al. | |
| 2009/0041413 A1 | 2/2009 | Hurley | |
| 2009/0082010 A1 | 3/2009 | Lee et al. | |
| 2009/0088155 A1 | 4/2009 | Kim | |
| 2009/0124235 A1 | 5/2009 | Bosch et al. | |
| 2009/0286484 A1 | 11/2009 | Phung et al. | |
| 2009/0325634 A1 | 12/2009 | Bienas et al. | |

* cited by examiner

*Primary Examiner* — Lewis West
(74) *Attorney, Agent, or Firm* — Procopio, Cory, Hargreaves & Savitch LLP

(57) ABSTRACT

A messenger strand mounted low-power pico-cell radio, having its own environmentally controlled box, mounted on utility messenger strands, connects to the cable using the Internet protocol (IP) for back-haul, and has in-band monitor and control capability. These pico-cell radios also receive power through the same cable connection. The configuration control and monitoring is by independent discretely-managed internal mechanisms that can be remotely addressed. These internal mechanisms include the modem for backhaul, wireless radio transceiver(s), and the system management device for operation, administration, maintenance, and control. Such pico-cell radios help to provide wireless connectivity and coverage efficiently by reducing dark spots in wireless coverage. Distributing these radios in reasonable, close proximity enables wireless coverage in difficult terrains, where current high power systems fail. The radios disclosed herein eliminate the need and cost for additional power lines and IP connection lines, and are therefore easy to install and maintain.

18 Claims, 4 Drawing Sheets

MESSENGER STRAND MOUNTED PICO-CELL RADIO

PRIORITY CLAIM

This application is a continuation of U.S. patent application Ser. No. 12/124,470, filed May 21, 2008, entitled "MESSENGER STRAND MOUNTED PICO-CELL RADIO," the entirety of which is hereby incorporated by reference.

TECHNICAL FIELD

The invention relates to wireless communication systems. In particular, the invention relates to pico-cell radios mounted on utility messenger strands.

DISCUSSION OF THE PRIOR ART

Currently, cell phone connections are made using high-power radios that are installed on radio towers and that are back-hauled through high bandwidth connections, typically T1 lines, to the mobile carriers. These radio cells are powered through external power supplies from main power lines.

A cell based wireless communication system that is currently implemented for cell phone communication consists of at least a mobile station and a base station connected to multiple stationary radios and forward and reverse links between them. The geographical area to be covered by wireless communication is divided into various cells. The radio equipment, i.e. a base-station transceiver subsystem (BTS), is installed in each such cell. The BTS consists of five major blocks a radio frequency (RF) front-end, transceivers, modem processors, a controller, and a power supply. The RF front-end and transceiver form a stationary radio unit (RU) within the BTS. The rest of the blocks typically form the main unit (MU) of the BTS. The BTS also includes antennas. The antennas can be omni-directional, or directional if the cell is divided into sectors. Each sector may have its own transmitting and receiving antennas. Two antennas per sector are required for diversity reception, thereby minimizing the effects of fading and multipath. In cells where the communication capacity is high, more than one RF carrier signal can be transmitted. This again increases the number of antennas. In older, integrated BTS systems, the BTS cabinet is located on the ground or in a housing near a mounting structure, such as a pole or a tower. The antennas are mounted on top of the mounting structure. The BTS is connected to the antenna by a coaxial cable that is typically about 50 to 200 feet long, depending on the height of the tower and the location of BTS on ground. Due to the cable length, a significant amount of power is lost between the BTS and the antenna. To reduce the power loss, thicker power cables are used, typically ¾" to 1" in diameter, which increases cost. Even then, at the required frequency of transmission, the power loss is considerable. This leads to degradation of receiver sensitivity and a reduction in the final transmitted power. The maintenance of these BTS is done by having the maintenance personal drive out to the location (truck roll) to check and repair of any faults at the site. These truck rolls are very expensive.

FIG. 1 shows a prior art implementation of a more modern, cell-based communication system base station 100. In this typical system, the RU (radio unit) 110 is removed from the MU 105 and located closer to the antenna 120 to reduce the problem of power loss. The MU 105 is retained at the bottom of the mounting structure 130. Before up-conversion to RF, the signal is carried by the cable 140 from MU 105 to RU 110. Because the signal is a low frequency signal, the loss in the cable is minimized. On the receive side, the cable also carries a low frequency signal because the RF is converted to a low frequency in the RU 110 and passed to the MU 105 for onward transmission. The high power amplifier can be replaced by a lower power amplifier because the cable loss is reduced. This helps reduce the size and weight of the RU 110. The size of the MU 105 is also reduced because the radio unit is removed from it. Many RUs 110 can be connected to a single MU 105, which then acts as a main base station. One or more antennas 120 can be connected to each RU 110, depending upon the requirements. The RUs 110 can be made to operate in different frequencies, different power levels, and different protocols.

A direct current (DC) power line 170 supplies power to the RU 110 by means of external power supplies 150, converted from main power lines 160. These power lines 160, from a main power source, must be installed at the site for the power to be supplied to the external power supplies 150. This increases the cost of establishing the cell based system 100.

Recent advances in wireless implementation have included messenger strand mounted modems for static connectivity to homes, etc. These dedicated systems are used to connect a receiver to a transmitter, typically using a high speed bidirectional antenna. This helps set up back haul stations for providing high speed links to homes, etc., as described in the Smith U.S. Pat. No. 7,162,234, by using pole mounted separate antennas. The capability to act as a base station with the ability to transfer connection of portable/mobile wireless devices between adjacent strand mounted modems as the mobile wireless device customer moves from coverage location of one modem to another has not been thought of. Such a system will be invaluable if implemented to provide the coverage in inaccessible areas and hilly regions, where wireless dark areas exist due to the inability of the cellular wireless towers to provide the necessary coverage.

SUMMARY OF THE INVENTION

A self-contained remotely-managed, outdoor, aerial messaging, strand mounted radio transceiver system serving mobile wireless client devices is disclosed, in which one or more antennas are attached to utility messenger strands. Such system is back-hauled to the mobile operator switching facilities using internet protocol (IP) through coaxial cable, twisted pair(s), fiber optics, or wireless, and receives its power through pre-existing coaxial cable or twisted pair power distribution infrastructure. The system has capability for remotely or locally managing all of its components. The remote managed solution and deployment methodology applies wireless connectivity efficiently when attached to an aerial messaging strand to enable mobile wireless client devices. One or multiple systems, independently backhauled, distributed in proximity to one another, provide increased user capacity and wireless coverage in difficult terrains, where current high power systems fail to meet the requirements of quality, coverage and cost. The radios disclosed herein eliminate the need and cost for additional power lines and IP connection lines, and are also easy to install and maintain.

DETAILED DESCRIPTION OF THE INVENTION

Figure 1:
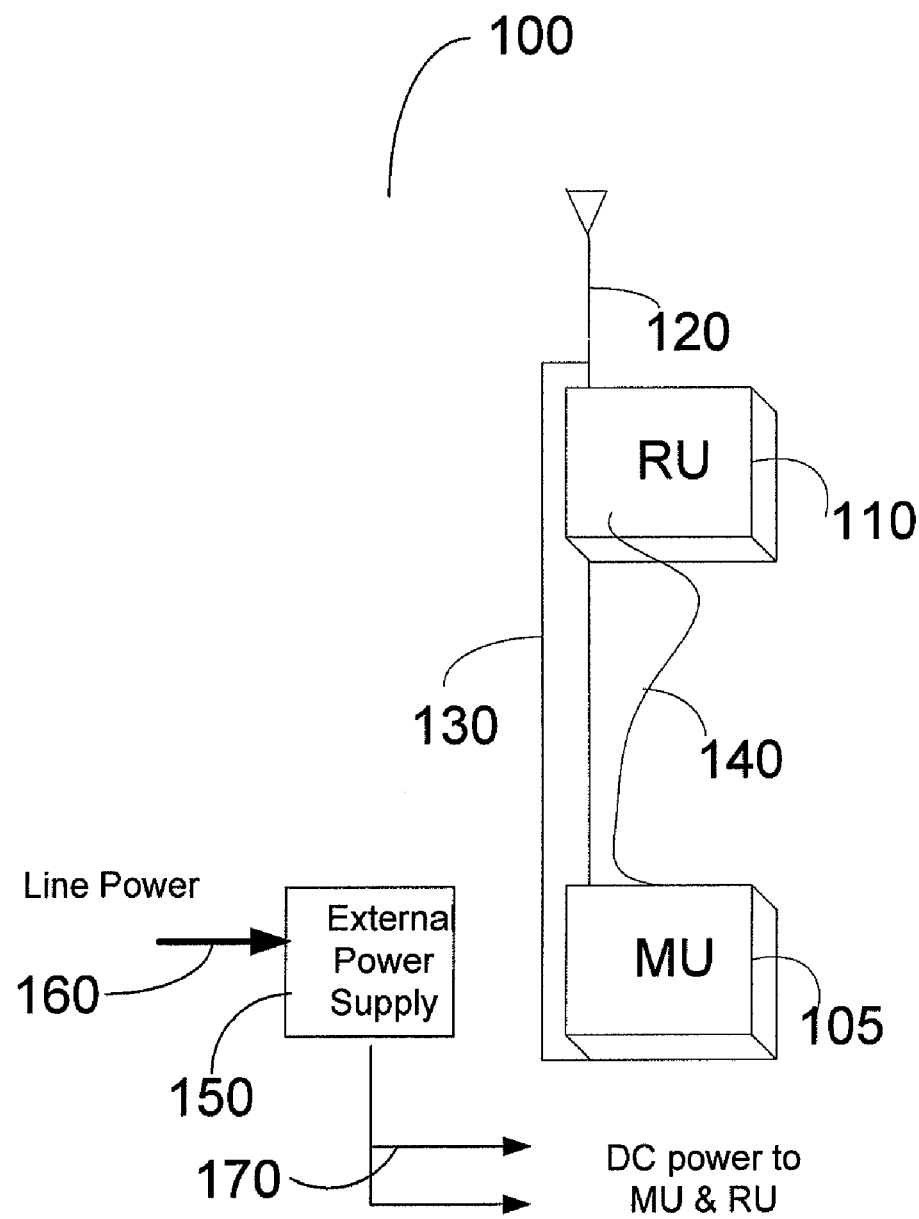
FIG. 1 shows a prior art cell-based communication system.

Currently, cell phone connections are made through high-power radios that are installed on radio towers, and that are back-hauled through high bandwidth connections, typically T1 lines, to the mobile carriers. These radio cells are powered through external power supplies from main power lines.

A self-contained, remotely-managed, outdoor, aerial-strand-mounted radio transceiver system, is disclosed. Such system was used to serve mobile wireless client devices. Such system has antenna(s) attached to utility-messenger strands. The system is back-hauled to the mobile operator switching facilities through coaxial cable, twisted pair(s), fiber optics, or wireless and receives its power through pre-existing coaxial cable or twisted pair power distribution infrastructure. Such system has used to serve mobile wireless client devices. The system is comprised of interdependent and discretely-managed internal mechanisms addressable by multiple parties. These remotely managed mechanisms, without limitation, include:
(1) the modem for backhaul;
(2) the wireless radio transceiver(s);
(3) the independent system management device for operations-administration and maintenance of the system; and
(4) the support/control/monitoring resources. This remote-managed radio solution and deployment methodology helps to provide wireless connectivity much more efficiently, as well as to provide better signal coverage and/or higher user capacity, when attached to aerial messenger strand to serve, facilitate, or enable mobile wireless client devices. Having one or more of these radio systems, each with independent backhaul, placed as needed or distributed in proximity to one another, enables wireless coverage and increased capacity where high powered radio systems may fail due to a variety of reasons including, but not limited to, cost, timeline, environment, permissibility, and/or spectral limitations.

A messenger strand mounted, low-power radio, i.e. a low-power radio that is mounted on messenger strands, that connects to the cable using the Internet protocol (IP) for backhaul needs, and that receives its power through the same cable connection, is disclosed. Such radio helps to provide wireless connectivity and coverage much more efficiently by reducing dark spots in wireless coverage. The radios used in the invention are pico-cell radios that are placed at aerial cable locations, and that are attached to the messenger strand. Distributing these radios in reasonable, close proximity enables wireless coverage in difficult terrain, where current high power systems fail to meet the requirements of quality, coverage and cost. The radios disclosed herein eliminate the need and cost for additional power lines and IP connection lines, and are therefore easy to install.

The disclosed invention is a messenger strand mounted radio (MSMR) comprising outdoor equipment which houses wireless radios. The MSMR is a small, self contained unit/system that clamps to, and draws power and transmission from, an overhead cable plant, usually a cable television cable.

The MSMR is used in an outdoor environment to fill-in targeted gaps in the network, where either coverage or capacity enhancement are required. The MSMR solution could be used in areas where it is otherwise cost prohibitive to provide targeted dark areas, or impossible to clear zoning in tougher jurisdictions; such as busy intersections, areas with hills, canyon and mountain roads, schools, and very RF restrictive neighborhoods.

The MSMR seamlessly interfaces with the network of a cable operator, or a Multi-Service Operator (MSO), thus extending the reach of cable operator's hybrid fiber and coax network using wireless technologies. The equipment is housed in a MSMR box which protects the components of the MSMR from environmental impact. The housing of the components also enables easy, secure mounting of the MSMR to the messenger strand. The MSMR is unique in that it is placed on the coaxial aerial strand, which is part of the outdoor cable plant. Placing the MSMR on the messenger strand at, typically, a 20-23 feet elevation provides good height over terrain for radio coverage with low power radios. The aerial cable plant also provides easy access to input power and data over cable service interface specifications (DOCSIS) data backhaul.

Figure 2:
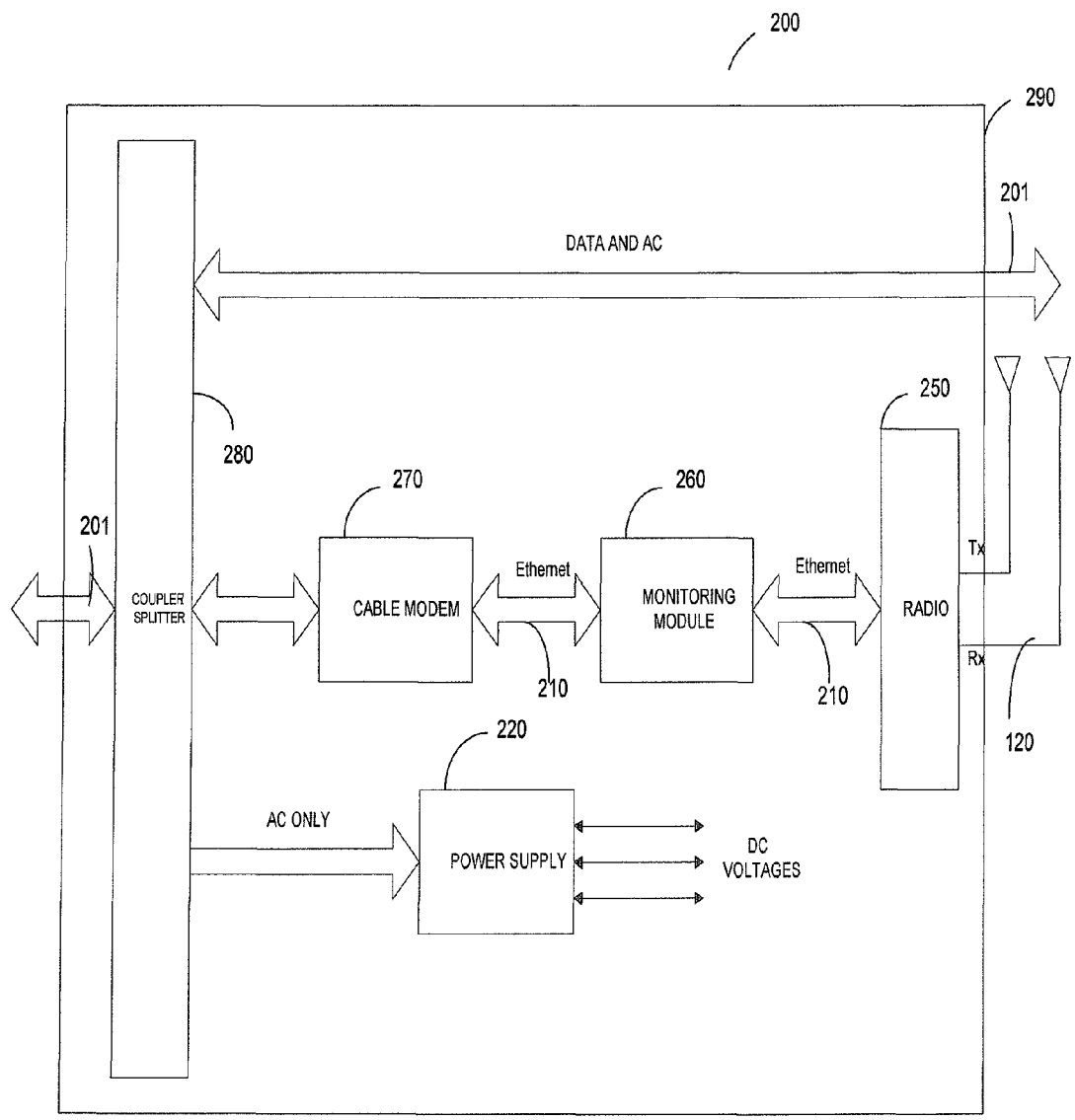
FIG. 2 is a functional block diagram showing a messenger strand mounted radio (MSMR) for use as a pico BTS according to the invention.

FIG. 2 is a block diagram representation of an exemplary and non-limiting MSMR 200, which can be used as a pico base-station transceiver subsystem (BTS), within its environmental protection housing box 290. The MSMR 200 comprises a radio RF front-end, including a transceiver 250 (radio or radio unit), antenna 120, monitoring module 260, cable modem 270, coupler/splitter 280, and power supply 290. The exemplary radio 250 used in this embodiment is a pico-cell radio which is able to support IP over Ethernet backhaul, and which is small enough and light enough to be supported on the messenger strand. It is also a low-power radio, such that the power needed for operation is provided through the cable 201.

Although in the example shown in FIG. 2 the choice of radio 250 is a cellular BTS radio, typically referred to as a pico-cell radio, this is not limiting, and other types of radios may be used without departing from the spirit of the disclosed invention. Therefore, not only cellular BTS radios 250 may be used, but also WiFi, repeaters, and WiMAX radios, depending on the application. The radios 250 can also be employed in point-to-point, point-to-multipoint, or mesh arrangements. The MSMR 200 is capable of being configured to transmit and receive in any one of the different cellular protocols. This configuration can be done remotely through the cable connection or locally.

The MSMR 200 uses a standard DOCSIS cable modem 270. The cable modem 270, the monitoring module 260, and the radio 250 are IP addressable. This enables the in-band monitoring and control of the cable strand mounted radio 200 through the IP network and monitoring module 260. The cable modem 270 interfaces with a coupler/splitter 280 to connect to the available cable 201 for back haul access. It interfaces with the monitoring module 260 through a standard Ethernet cable 210, typically Cat5. Similarly, the monitoring module 260 interfaces with the radio 250, typically via a Cat5 Ethernet cable 210. The power for the MSMR 200 is derived from the quasi-square wave alternate current (AC) available from the coaxial cable plant through the coupler/splitter 280. This AC power is supplied to the power supply unit 220 to generate the needed DC supplies to power the MSMR. The MSMR 200 is connected to the aerial cable, typically via a standard F-connector tap, at the coupler/splitter 280. The housing box 290 of the MSMR 200 is suspended from the cable strand using suitable means for attachment. One such attachment means is disclosed in U.S. patent application Ser. No. 12/046,414, Cable Strand Bracket, which is assigned to a common assignee, and which is incorporated herein by this reference thereto for all that it contains.

Figure 3:
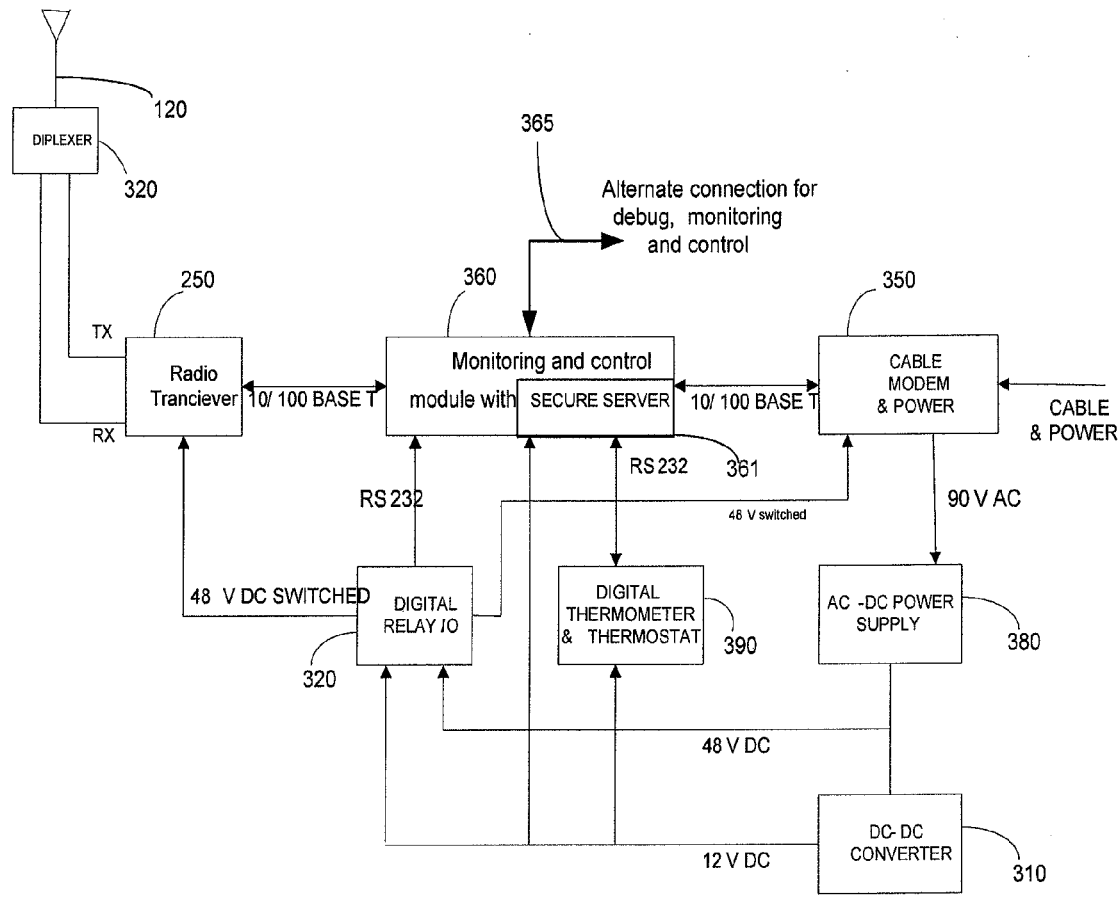
FIG. 3 is a block diagram showing the MSMR consisting of a radio transceiver, a cable modem with power supply and remote, in-band management according to the invention.

FIG. 3 is a schematic diagram that shows an exemplary and non-limiting MSMR 200. The cable brings power and data into the cable modem and power unit 350. The power input from the cable is separated from the data input in the power section of the cable modem and power unit 350. The extracted AC power is fed into the DC power supply unit 380 which outputs a regulated DC output. Further DC voltages are typically generated from this DC output supply using DC-DC converters 310 as may be necessary. The typical power input at the input from the cable is a 35-90V quasi-square wave. The power supply unit 380, typically converts this square wave AC power to 48V DC and, through a DC-to-DC converter 310, to 12V DC or other needed values to power the circuit components of the MSMR 200.

FIG. 3 also shows the system with its remote, in-band management capability using the monitoring and control module 360. To overcome the problems caused by installing the MSMR system high above the ground in an outdoor environment with dynamic address changes and limited access and visibility for configuration, repair and maintenance, a system management capability using a secure server 361 is included as part of the monitoring and control module 360. The data stream from the cable modem and power unit 350 is fed to the monitoring and control module 360 through, for example, a 10/100 Base-T LAN connection. The environmental control is handled by the secure server 361 that is part of the monitoring and control module 360. The secure server 361 is used to provide effective monitor and control of the environmental conditions of the MSMR 200 continuously. The monitoring and control module 360 has a temperature and humidity measuring unit and a thermostat 390 that is connected to it to provide environmental control for the housing box 290. Other necessary sensors and actuators may also be connected to it. The environmental control capability built into the MSMR 200 enable it to operate in an outdoor environment as necessary. The monitoring and control module 360 has complete in line capabilities, using the secure server 361 for debugging, repair, measurement, calibration, and configuration to service the MSMR 200. Optionally, the monitoring and control module 360 can also have an external connection port 365 that allows on-site local debugging, repair, measurement, calibration, and configuration facilities to enable local servicing of the MSMR 200.

The secure server 361 enables the remote Network Operation Center (NOC) to remotely power cycle the radio transceiver(s) 250, the cable modem 350, or the secure server 361 itself, individually or collectively, in the event of a failure. To allow massive deployment, the secure server 361 adapts to addressing dynamically in the event of an address change. The secure server 361 also supports a dynamic IP/NOC addressable—via Dynamic Domain Name Service (DynDNS) or report-home mechanism to ease its configuration and IP address management. Thus, whenever the IP assignment(s) of the MSMR change(s), the secure server 361 in the MSMR reports it to the one of two or more independent home configuration servers so that dynamic name to IP translation services can always be performed correctly. The secure server 361 also has built in uptime counters for verifying its own uptime, independently of the availability of other network functions, in the event of a backhaul failure.

The secure server 361, forming part of the monitoring and control module 360, also enables efficient transfer and timely hand-off of the cell units, or mobile wireless between adjacent MSMRs 200. The use of the secure server 361 in the control and monitoring unit 360 enhances the quality of service and provides improved user experience during the hand off process between MSMRs 200 by making it seamless, transparent, and timely.

The pico-cell radios 250 used are low power radios. They operate as pico BTS devices. The radio up-converts the quadrature amplitude modulation (QAM) signal to a 64 QAM or 256 QAM RF channel, and transmits it over the air. The typical transmitted downstream frequency range is 91 to 857 MHz and the typical channel bandwidth available is 6 MHz.

The radio 250 is connected to the transmitting and receiving antennas 120. The RF coverage of the radio 250 is dependent on the type and gain of the antennas 120, the frequency of the signals, the RF output power, and the required signal-to-noise ratio (SNR). For a typical WiFi 802.11 access point transmitting 1 Watt using a 5 dBi omni antenna, typical outdoor coverage radius is 500 to 700 feet of line-of-site. For indoor building penetration, the typical radius is 300 feet. The MSMRs 200 have a limited capability to increase power, due to the limitation of providing the power supply through the cable. This necessitates the MSMRs 200 to be in reasonably close proximity to each other to provide the necessary coverage, even if power consumption increases.

Even though the disclosure typically covers the use of dual antennas for the typical application, this is not to be considered limiting, as a single antenna can be used for both transmission and reception. This is done by coupling the antenna to the transceiver using either a duplexer or a diplexer as is done in other similar communication applications.

Figure 4:
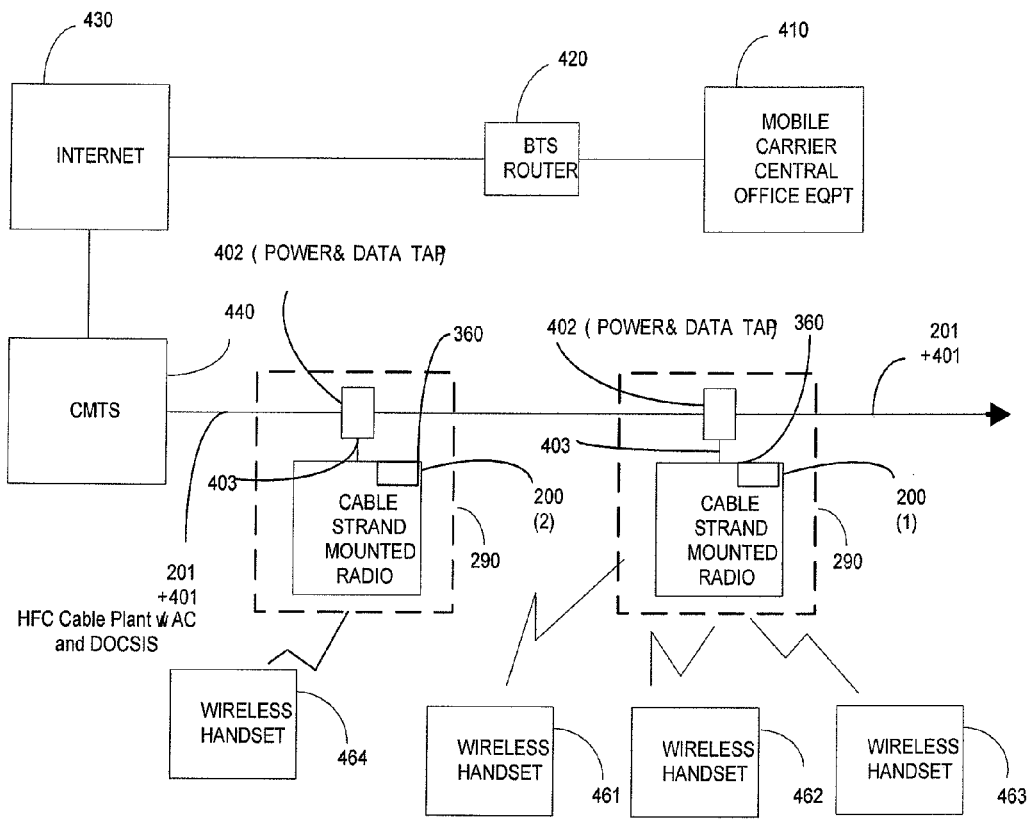
FIG. 4 is a block diagram showing a system with the MSMR used as pico BTS according to the invention.

FIG. 4 shows a communication system 400 in which the MSMR 200 is used. The MSMR 200, in its housing box 290, is suspended from the cable strand 401. The cable 201 is tapped 402 for power and data, and a connection 403 is made to the cable modem 350 in the housing box 290. This connects the MSMR 200 to the cable for backhaul through the cable. A group of pico BTS units in the form of the MSMRs 200 connect on the cable strand to cover a region. They connect via the established backhaul to the cable modem termination systems (CMTS) 440. From there, they connect through a standard connection via internet 430, to the main BTS router 420 and to the carrier central office equipment 410. FIG. 4 shows two MSMRs 200 connected to the cable as a pico BTS. One SCMR 200(1) pico BTS communicates with three mobile wireless units 461, 462, and 463, and a second MSMR 200(2), as a second pico BTS, communicates with one mobile wireless unit 464. Typically, the local MSMR 200 used as pico BTS has the capability and intelligence built-in to route and connect the local traffic, and only sends out-of-cell traffic for routing to the central unit 410.

The typical housing box 290 is made of machined casting which is electro-magnetic interference (EMI) and humidity sealed. No moving components, such as fans and electromechanical switches, are used. This ensures high reliability. This arrangement is possible due to the low-power dissipation of the MSMR 200. The MSMR 200 is environmentally hardened to meet the reliability requirements of standard outdoor cable plant equipment a typical cable strand mounted radio 200 is designed with a form factor that fits the dimensions per GO-95 to ensure that there is no interference with other strands on the utility poles.

Installation of the MSMR 200 is very easy. The housing box 290, with the necessary equipment inside, can be mounted on the aerial strand by tightening down the housing box 290 strand clamps. After mounting the housing box 290, a power and data tap 402 is made to the cable plant near the location of the housing box 290. A connection 403 is then made to the cable modem 350 inside the housing box 390 from the tap 403 using a short length of coaxial cable. Typical time for installation of the MSMR 200 is less than one hour using a bucket truck and standard cable technician tools.

Use of the MSMR 200 as a pico BTS has at least the following advantages:
1. The low power radios, distributed fairly close to each other, provide more efficient wireless coverage by reducing coverage dark spots in difficult terrain, where high power system do not penetrate or are not efficient.
2. Lower cost of installation because the complete installation can be typically handled in an hour or two.
3. Lower input in time and labor for configuration, maintenance and repair as most of this is done on-line. This results in lower cost of operation.
4. Better quality of service to users is ensured by use of the optimized hand off procedure used.
5. The MSMRs are powered from the cable and, as such, do not need special power connections to be drawn to each location where installation is done.
6. The use of the cable for backhaul reduces the cost of pulling cable to provide backhaul facility.
7. No new towers need to be established.
8. Low cost of system due to use of lower cost pico BTS.
9. Faults in the system have limited impact because load can be taken over by nearby pico BTS.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A cable strand mounted radio system, the system comprising:
   a cable modem for communicating over a cable strand and configured to use the cable strand for backhaul capability;
   a coupler/splitter in communication with the cable modem and for coupling to the cable strand to provide backhaul access for the cable modem and for extracting electrical power from the cable strand;
   a monitoring and control module in communication with the cable modem, the monitoring and control module comprising environmental sensing and control elements;
   a radio transceiver in communication with the cable modem and in communication with the monitoring and control module;
   one or more antennas in communication with the transceiver for transmission and for reception of radio signals; and
   a power supply unit connected to the coupler/splitter and for receiving electrical power from the cable strand, the power supply configured to convert the electrical power from the cable strand and supply the converted power to the cable modem, the monitoring and control module and the radio transceiver.

2. The system of claim 1, further comprising:
   a weather proof housing for enclosing all components of the system.

3. The system of claim 1, wherein the monitoring and control module further comprises a secure server and a data stream to and from the cable modem flows through the monitoring and control module and to and from the radio transceiver.

4. The system of claim 1, wherein the monitoring and control module includes a temperature and humidity measuring unit.

5. The system of claim 1, wherein the radio unit comprises a pico-cell radio unit.

6. The system of claim 1, wherein the monitoring and control module is configured to communicate with a network operations center via the cable modem.

7. The system of claim 3, wherein the monitoring and control module is configured to provide in-line operational capability for configuration of the system.

8. The system of claim 1, wherein the monitoring and control module is configured for providing in-line control of the environment and radiated power of the system.

9. The system of claim 1, wherein the monitoring and control module comprises means for providing local access to the system for at least one of measurement, calibration, debug, and repair.

10. A cable strand connectable wireless communication system, the system comprising:
    a cable modem and power unit configured to be coupled with the cable strand, to send and receive data over the cable strand and to receive electrical power from the cable strand;
    a direct current (DC) power supply unit in communication with the cable modem and power unit, the DC power unit receives electrical power from the cable modem and power unit and outputs a regulated DC output;
    a monitoring and control module in communication with the cable modem and power unit, the monitoring and control module comprising environmental sensing and control elements
    a radio transceiver in communication with the cable modem and power unit and in communication with the monitoring and control module; and
    one or more antennas in communication with the transceiver for transmission and for reception of radio signals.

11. The system of claim 10, wherein the monitoring and control module further comprises a secure server configured to communicate with a network operations center.

12. The system of claim 10, wherein the monitoring and control module includes a temperature and humidity measuring unit.

13. The system of claim 10, wherein the radio unit comprises a pico-cell radio unit.

14. The system of claim 11, wherein the monitoring and control module is configured to power cycle the radio transceiver and the secure server, individually and collectively restart the system.

15. The system of claim 10, wherein the monitoring and control module is configured to provide in-line operational capability for configuration of the system.

16. The system of claim 10, wherein the monitoring and control module is configured for providing in-line control of the radiated power of the system.

17. The system of claim 10, wherein the monitoring and control module comprising means for providing local access to the system for at least one of measurement, calibration, debug, and repair.

18. A cable strand mounted radio system, the system comprising:
    a cable modem for communicating over a cable strand and configured to use the cable strand for backhaul capability;
    a coupler/splitter in communication with the cable modem for coupling to a cable strand to provide backhaul access for the cable modem and for extracting electrical power from the cable strand;

a monitoring and control module in communication with the cable modem and configured to provide in-line operational capability for configuration of the system;

a radio transceiver in communication with the cable modem and in communication with the monitoring and control module;

one or more antennas in communication with the transceiver for transmission and for reception of radio signals; and a power supply unit connected to the coupler/splitter and for receiving electrical power from the cable strand, the power supply configured to convert the electrical power from the cable strand and supply the converted power to the cable modem, the monitoring and control module and the radio transceiver.

* * * * *